United States Patent
Okawa

(10) Patent No.: US 8,218,881 B2
(45) Date of Patent: Jul. 10, 2012

(54) CLUSTERING PROCESSING METHOD, CLUSTERING PROCESSING APPARATUS, AND NON-TRANSITORY COMPUTER-READABLE MEDIUM

(75) Inventor: Koji Okawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 12/825,062

(22) Filed: Jun. 28, 2010

(65) Prior Publication Data

US 2011/0026841 A1 Feb. 3, 2011

(30) Foreign Application Priority Data

Aug. 3, 2009 (JP) ................................. 2009-181016

(51) Int. Cl.
*G06K 9/62* (2006.01)
(52) U.S. Cl. ...................................................... 382/225
(58) Field of Classification Search ............ 382/181–231
See application file for complete search history.

(56) References Cited

U.S. PATENT DOCUMENTS

| 6,701,010 | B1 | 3/2004 | Katsuyama |
| 7,623,712 | B2 | 11/2009 | Dai et al. |
| 2003/0169919 | A1* | 9/2003 | Ikeda et al. ................. 382/159 |
| 2005/0271281 | A1* | 12/2005 | Simard et al. ............... 382/225 |
| 2006/0153460 | A1* | 7/2006 | Kim et al. .................. 382/225 |
| 2007/0025617 | A1* | 2/2007 | Dai et al. ................... 382/180 |

FOREIGN PATENT DOCUMENTS

| JP | 11288465 A | 10/1999 |
| JP | 2006344069 A | 12/2006 |
| JP | 2007158725 A | 6/2007 |
| JP | 2008206073 A | 9/2008 |

* cited by examiner

*Primary Examiner* — Alex Liew
(74) *Attorney, Agent, or Firm* — Fitzpatrick, Cella, Harper & Scinto

(57) ABSTRACT

A clustering processing method for dividing a samples into a plurality of clusters based on a feature amount of each sample, the plurality of clusters each belonging to one of a plurality of layers composed of M layers (M=2, ..., K), the clustering processing method comprises a sample allocating step of allocating a sample targeted for processing to a cluster belonging to a first layer, based on a result of comparing the feature amount of the target sample with a representative feature amount of each of clusters belonging to the first layer; a determination step of determining whether to allocate a cluster belonging to an M−1th layer to an Mth layer; and a cluster allocating step of allocating a cluster belonging to the M−1th layer to the Mth layer, if it is determined in the determination step to allocate a cluster belonging to the M−1th layer to the Mth layer.

13 Claims, 12 Drawing Sheets

FIG. 5A
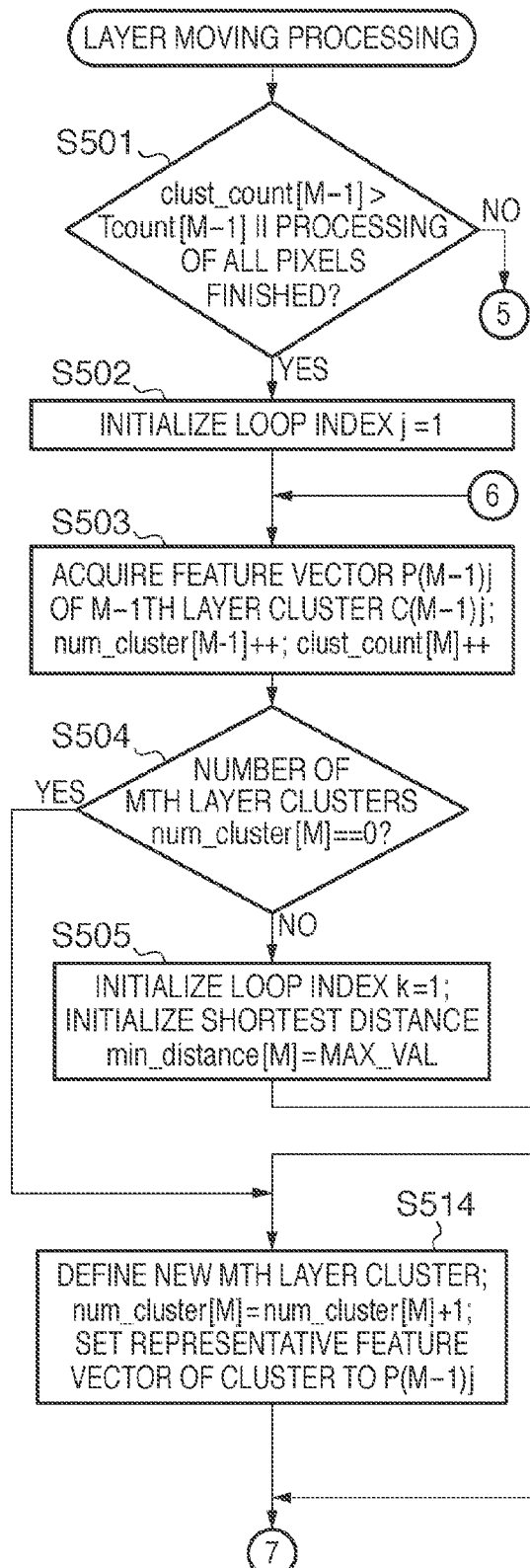
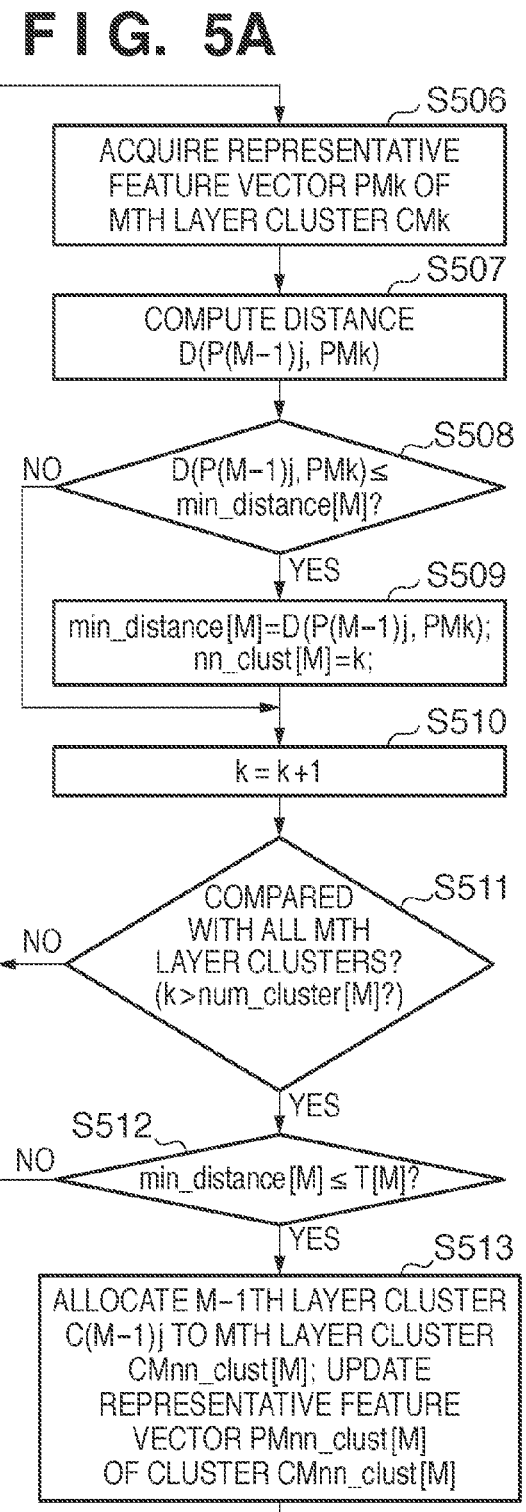

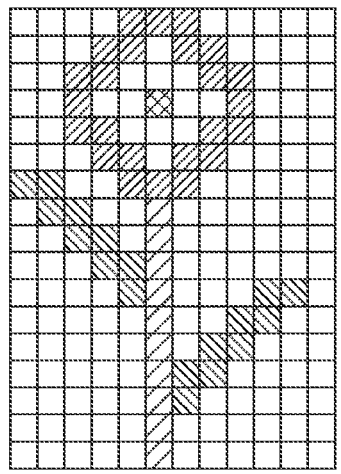

| 10 | 10 | 10 | 31 | 31 |
|----|----|----|----|----|
| 11 | 11 | 29 | 29 | 60 |
| 90 | 91 | 89 | 90 | 60 |

FIG. 9B

| 10 | 10 | 10 | 31 | 31 |
|----|----|----|----|----|
| 11 | 11 | 29 | 29 | 60 |
| 90 | 91 | 89 | 90 | 60 |

902 — 10 (top-left); 903 — top boundary; 904 — 31; 901 — right side; 905 — 11

FIG. 9C

| 10 | 10 | 10 | 31 | 31 |
|----|----|----|----|----|
| 11 | 11 | 29 | 29 | 60 |
| 90 | 91 | 89 | 90 | 60 |

FIG. 9D

| 10 | 10 | 10 | 31 | 31 |
|----|----|----|----|----|
| 11 | 11 | 29 | 29 | 60 |
| 90 | 91 | 89 | 90 | 60 |

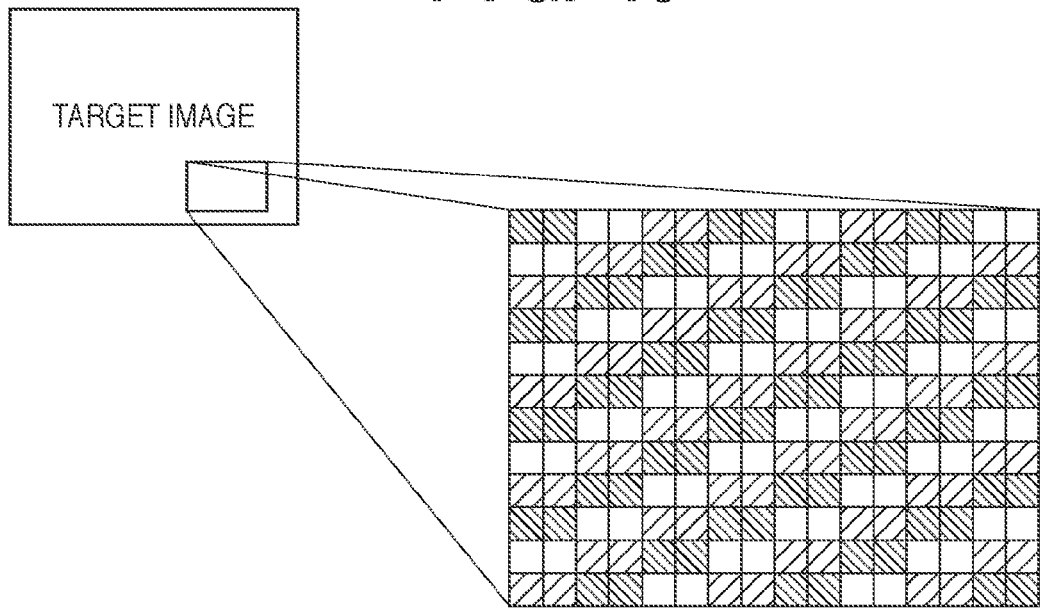

CLUSTERING PROCESSING METHOD, CLUSTERING PROCESSING APPARATUS, AND NON-TRANSITORY COMPUTER-READABLE MEDIUM

BACKGROUND OF THE INVENTION

1. Field of the Invention

The present invention relates to a clustering processing method, a clustering processing apparatus and a computer program for dividing a sample group.

2. Description of the Related Art

Document digitization goes beyond merely obtaining image data by reading a paper document using a scanner or the like. For example, processing for dividing image data into regions having different qualities constituting a document, such as characters, graphics, photos and tables, and converting the respective regions to data in the most suitable format according to purpose, such as converting character regions to character codes, graphics regions to vector data, background and photo regions to bitmap data, and table regions to structure data, is performed in document digitization processing.

As for conversion methods to vector data, in Japanese Patent Laid-Open No. 2007-158725, region division is performed using clustering processing, the contours of the regions are extracted, and the extracted contours are converted to vector data. Japanese Patent Laid-Open No. 2008-206073 discloses an image processing method that involves separating an image into background and foreground, converting the foreground to vector data, and performing data compression on the background with a dedicated background method. Japanese Patent Laid-Open No. 2006-344069 discloses a method for removing noise clusters remaining after clustering processing has been performed on an original read with a scanner.

Incidentally, in terms of methods for dividing an image into regions using clustering processing, a nearest neighbor clustering method is known. The nearest neighbor clustering method involves searching for a cluster having the nearest feature vector in feature space by comparing the feature vector of a target pixel with the representative feature vector of each cluster. If the distance is less than or equal to a prescribed threshold, the target pixel is allocated to that cluster. If not, a new cluster is defined and the target pixel is allocated to that cluster. Note that generally color information (RGB pixel values) is used here as the elements of feature vectors (feature amounts). The centroids of clusters are generally used as the representative feature vectors of clusters. That is, the average value of the feature vectors (color information) of pixels allocated to a cluster.

With the nearest neighbor clustering method, the distance from the representative feature vectors of the all of the clusters must be computed for each pixel. In response to this, a color image processing apparatus has been disclosed in Japanese Patent Laid-Open No. 11-288465, for example, in order to reduce the number of calculations. With the conventional technique, clustering is performed based on the feature vectors (color information) of the target pixel and neighboring pixels, and cluster grouping is then performed based on the color information and geometric information of the clusters. Here, geometric information refers to coordinate information or the like representing the distance between clusters in real space.

However, with the conventional technique in Japanese Patent Laid-Open No. 11-288465, because a cluster is newly defined and the pixel of interest is allocated to that cluster in the case where the feature vectors of the target pixel and neighboring pixels are far apart, a large number of clusters are defined. Thus, there is a problem in that the processing time required for grouping increases.

SUMMARY OF THE INVENTION

In view of this, the present invention provides a clustering processing method capable of performing fast region division.

According to one aspect of the present invention, there is provided a clustering processing method for dividing a sample group into a plurality of clusters based on a feature amount of each sample, the plurality of clusters each belonging to one of a plurality of layers composed of M layers (M=2, ..., K), the clustering processing method comprising: a sample allocating step of allocating a sample targeted for processing to a cluster belonging to a first layer, based on a result of comparing the feature amount of the target sample with a representative feature amount of each of clusters belonging to the first layer; a determination step of determining whether to allocate a cluster belonging to an M−1th layer to an Mth layer; and a cluster allocating step of allocating a cluster belonging to the M−1th layer to the Mth layer, if it is determined in the determination step to allocate a cluster belonging to the M−1th layer to the Mth layer, wherein the sample allocating step, the determination step and the cluster allocating step are repeatedly executed with the samples each targeted for processing in order, until all of the samples are allocated to one of clusters belonging to a Kth and highest layer.

According to another aspect of the present invention there is provided a clustering processing apparatus for dividing a sample group into a plurality of clusters based on a feature amount of each sample, the plurality of clusters each belonging to one of a plurality of layers composed of M layers (M=2, ..., K), the clustering processing apparatus comprising: a sample allocating unit that allocates a sample targeted for processing to a cluster belonging to a first layer, based on a result of comparing the feature amount of the target sample with a representative feature amount of each of clusters belonging to the first layer; a determination unit that determines whether to allocate a cluster belonging to an M−1th layer to an Mth layer; and a cluster allocating unit that allocates a cluster belonging to the M−1th layer to the Mth layer, if it is determined by the determination unit to allocate a cluster belonging to the M−1th layer to the Mth layer, wherein processing by the sample allocating unit, the determination unit and the cluster allocating unit is repeatedly executed with the samples each targeted for processing in order, until all of the samples are allocated to one of clusters belonging to a Kth and highest layer.

According to another aspect of the present invention, there is provided a non-transitory computer-readable medium storing a computer program for causing a computer to functions as: a sample allocating unit that allocates a sample targeted for processing to a cluster belonging to a first layer, based on a result of comparing a feature amount of the target sample with a representative feature amount of each of clusters belonging to the first layer, out of clusters belonging to one of a plurality of layers composed of M layers (M=2, ..., K); a determination unit that determines whether to allocate a cluster belonging to an M−1th layer to an Mth layer; and a cluster allocating unit that allocates a cluster belonging to the M−1th layer to the Mth layer, if it is determined by the determination unit to allocate a cluster belonging to the M−1th layer to the Mth layer, wherein processing by the sample allocating unit, the determination unit and the cluster allocating unit is repeatedly executed with the samples each targeted for processing in order, until all of the samples are allocated to one of clusters belonging to a Kth and highest layer.

With the clustering processing method of the present invention, distance calculations are reduced by hierarchizing the cluster structure. Also, by disposing clusters with a high allocation probability in a layer in which samples targeted for processing are readily sorted, fast region division is made possible, since the frequency of distance calculations can be reduced in comparison with the conventional technology.

Further features of the present invention will become apparent from the following description of exemplary embodiments (with reference to the attached drawings).

BRIEF DESCRIPTION OF THE DRAWINGS

FIGS. 5A and 5B show flowcharts of a layer moving processing method according to the Third Embodiment.

FIGS. 7A to 7D show distance calculation frequencies of the clustering processing method according to the First Embodiment.

FIGS. 8A and 8B show distance calculation frequencies of the clustering processing method according to the First Embodiment.

FIGS. 9A to 9D show the accuracy of the clustering processing method according to the First Embodiment.

FIG. 10 shows an example of a target image of the clustering processing method according to the First Embodiment.

FIG. 11 shows distance calculation frequencies of the clustering processing method according to the Second Embodiment.

FIG. 12 shows distance calculation frequencies of the clustering processing method according to the Third Embodiment.

DESCRIPTION OF THE EMBODIMENTS

First Embodiment

The clustering processing method according to a First Embodiment of the present invention and the configuration of a vector data conversion apparatus that uses this method will be described with reference to FIG. 6.

Figure 6:
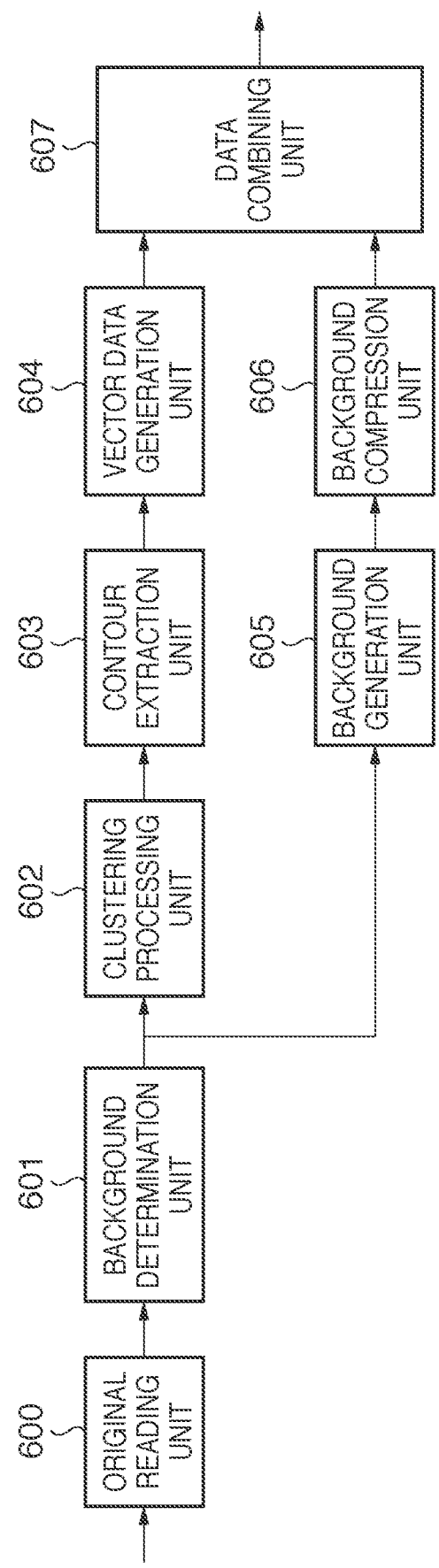
FIG. 6 shows a configuration of a vector data conversion apparatus.

FIG. 6 is an example block diagram representing a configuration of a vector data conversion apparatus. In FIG. 6, an original reading unit 600 reads an original, and, specifically, performs A/D conversion on image data optically read with a scanner and outputs the conversion result. A background determination unit 601 determines, for each pixel of image data output from the original reading unit 600, whether the pixel is foreground or background, generates a background flag indicating whether or not the pixel is background, and outputs the input image data after adding the flag. A method for determining background is disclosed in Japanese Patent Laid-Open No. 2008-206073. In the case of image data optically read by a scanner, for example, the color of the paper may be discriminated, and background pixels may be determined based on the determined color.

A clustering processing unit 602 performs region division on image data, applying the clustering processing method of the present embodiment. Image data output by the background determination unit 601 is input to the clustering processing unit 602 one pixel at a time in raster scan order. The clustering processing unit 602 outputs image data (data of each cluster region) that results from the region division (clustering processing). A contour extraction unit 603 extracts the contours of the regions (clusters) obtained by the clustering processing unit 602. A vector data generation unit 604 generates vector data based on the contours extracted by the contour extraction unit 603. The vector data generation unit 604 converts only foreground image data to vector data. A background generation unit 605 colors in pixels of the image data other than the background with the background color, based on the background flags output by the background determination unit 601, and outputs the result. A background compression unit 606 compresses data output by the background generation unit 605. The background compression unit 606 performs compression using JPEG, for example, but the present invention is not limited thereto, and other compression methods may be used. A data combining unit 607 combines vector data output by the vector data generation unit 604 and compressed data output by the background compression unit 606, and outputs the combined data.

Note that a sample targeted for clustering processing in the present embodiment refers to the individual pixels in image data, and a sample group refers to a set of pixels (i.e., the group of pixels constituting the image data). In the present invention, pixels in image data are described as samples, although when typical applications of clustering processing are taken into consideration, sample can, needless to say, be applied to an object (arbitrary data set) to which clustering processing is applicable, rather than being limited to pixels.

Clustering Processing

Figure 1:
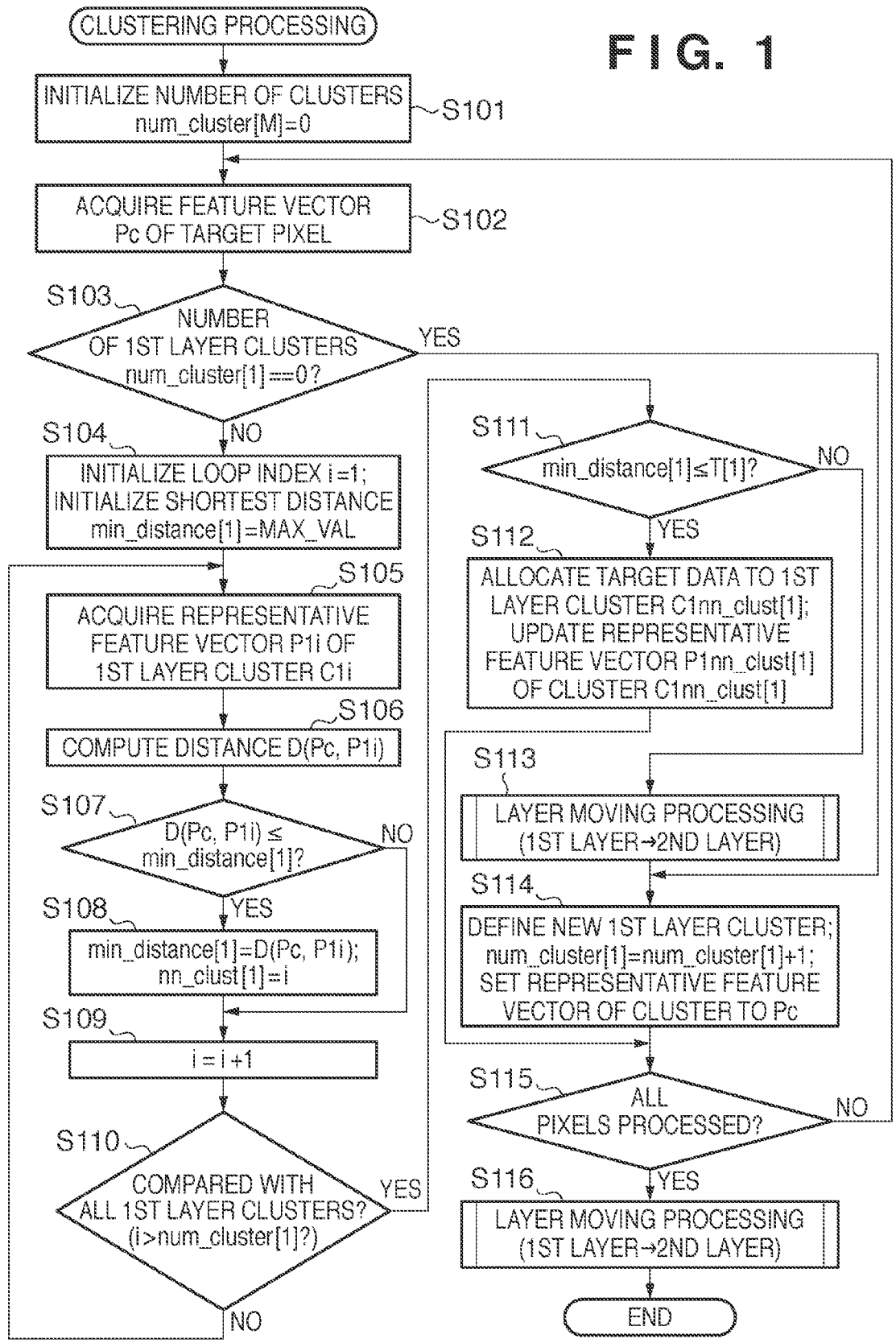
FIG. 1 shows a flowchart of a clustering processing method according to a First Embodiment.

Hereinafter, the processing of the clustering processing unit 602 will be described in detail using the flowchart shown in FIG. 1. In the present embodiment, a sample allocating step is realized using the processing from S103 to S112. Firstly, variables num_cluster[M] representing the number of clusters in the cluster groups belonging to an Mth (M=1, 2, ..., K−1, K) layer are all initialized to 0 (S101). K is a constant indicating the layer up to which clusters are defined. Note that in the clustering processing method of the present embodiment, clusters are defined up to a second layer (K=2). That is, the Kth and highest layer is the second layer. Next, a feature vector Pc of a pixel targeted for clustering processing (hereinafter, target pixel) is acquired (S102). In the clustering processing method of the present embodiment, RCB color space is given as feature space. That is, the RGB values of pixels are feature vectors (feature amounts), which are the elements of the pixels (three-dimensional elements consisting of R values, G values and B values). However, the clustering processing method of the present invention is not limited thereto. For example, pixel values in YUV color space may be user as feature vectors (feature amounts).

Subsequently, as a result of the processing from S103 to S110, a search is made for clusters belonging to the first layer, and the cluster nearest the target pixel is extracted. A first layer cluster search step is thereby realized. Firstly, it is determined whether a cluster belonging to the first layer has already been defined (S103). That is, it is determined whether the number of clusters belonging to the first layer num_cluster[1] is 0. If a cluster belonging to the first layer has not been defined (YES at S103), processing proceeds to S114. If a cluster has already been defined (NO at S103), processing proceeds to S104.

At S104, a loop index i and a variable min_distance[1] for scanning all clusters belonging to the layer of interest are initialized. The initial value of min_distance[M] is set to a value MAX_VALUE that is greater than the maximum distance that can be taken in feature space. min_distance[M] is a variable representing the smallest value of the distances between the feature vector (feature amount) of the target pixel (or cluster) and the representative feature vectors (representative feature amounts) of the clusters belonging to the Mth layer. Next, a representative feature vector P1$i$ of a cluster C1$i$ belonging to the first layer is acquired (S105). Next, a distance D (Pc, P1$i$) between Pc and P1$i$ is computed (S106). With the clustering processing method of the present embodiment, the Euclidean distance is computed as the distance D (Pc, P1$i$), but the clustering processing method of the present invention is not limited thereto, and the Manhattan distance may be computed, for instance. Next, the value of D(Pc, P1$i$) is compared with the value of min_distance[1] (S107).

If the value of D(Pc, P1$i$) is greater than the value of min_distance[1] (NO at S107), processing proceeds to S109. If the value of D(Pc, P1$i$) is less than or equal to min_distance [1] (YES at S107), the value of min_distance[1] is updated to D(Pc, P1$i$), and the value of nn_clust[1] is updated to cluster number i (S108). nn_clust[M] is a variable representing the number of the cluster belonging to the Mth layer having the nearest feature vector to the feature vector of the target pixel (or cluster). Next, the loop index i is updated (S109). At S110, it is determined whether comparison with all of the clusters belonging to the first layer has ended. If comparison has not ended (NO at S110), processing returns to S105. If comparison with all of the clusters has ended (YES at S110), processing proceeds to S111.

At S111, the value of min_distance[1] is compared with the value of a threshold T[1]. Note that a threshold T[M] is a prescribed value serving as a criterion for determining whether to allocate the target pixel (or target cluster) to one of the clusters belonging to the Mth layer that have already been defined, or to newly define a cluster belonging to the Mth layer and allocate the target pixel to that cluster. In order to allocate the target pixel to the first layer, for example, the distance to a cluster needs to be less than or equal to the first distance threshold T[1]. Similarly, in order to allocate the target pixel to the Mth layer, for example, the distance to a cluster needs to be less than or equal to the Mth distance threshold T[M]. If min_distance[1] is less than or equal to the threshold T[1] (YES at S111), the target pixel is allocated to a cluster C1 nn_clust[1] belonging to the first layer that is nearest in feature space, and the representative feature vector is updated (S112). A first layer cluster allocating step is realized by S112. After the processing of S112, processing proceeds to S115. On the other hand, if min_distance[1] is greater than T[1] (NO at S111), processing proceeds to layer moving processing for moving clusters from the first layer to the second layer in S113. The layer moving processing on clusters will be described later using FIG. 2. Next, a cluster whose representative feature vector is set to the feature vector of the target pixel is newly defined on the first layer, and num_cluster[1] is updated. Further, the representative feature vector of the cluster is defined as Pc (S114). A first layer cluster allocating step is thereby realized.

At S115, it is determined whether processing on all of the pixels has ended. If ended (YES at S115), clustering processing is ended after layer moving processing is performed at S116. If not (NO at S115), processing returns to S102, and the following pixel is targeted for processing.

Layer Moving Processing

Figure 2:
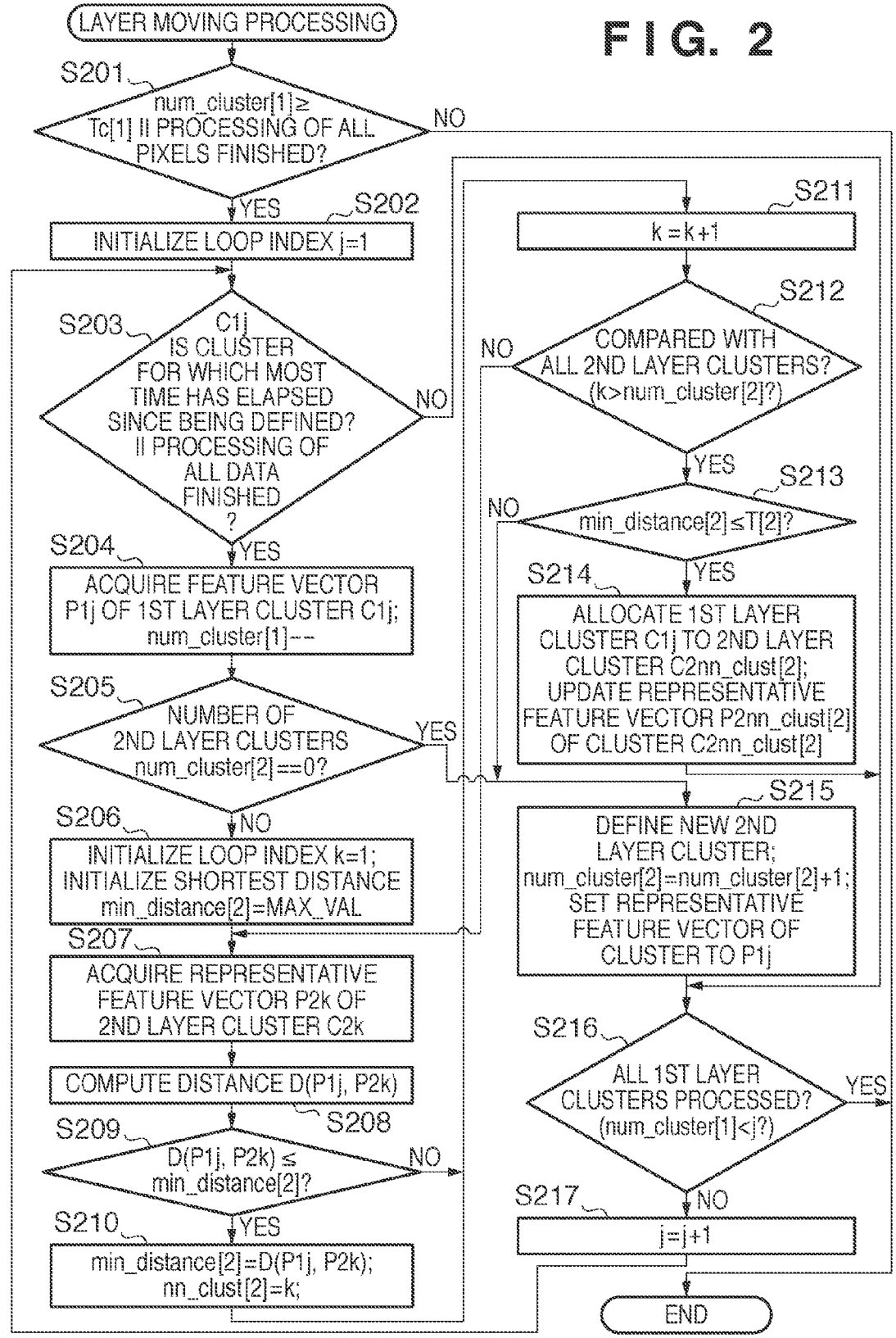
FIG. 2 shows a flowchart of a layer moving processing method according to the First Embodiment.

The layer moving processing of S113 and S116 will be described in detail using FIG. 2. The layer moving processing involves moving a cluster belonging to a lower layer to a higher layer, and allocating the cluster belonging to the lower layer to the higher layer. When allocating a cluster, if there is already an allocatable cluster on the higher layer, allocation is performed to that cluster, and if there is not, a cluster is newly defined and allocation is performed to that cluster. Note that in the present embodiment, a cluster allocating step is realized by the layer moving processing.

Firstly, in S201, it is determined whether processing of all of the pixels has finished, or whether num_cluster[1] is greater than or equal to a threshold Tc[1]. The threshold Tc[1] is a prescribed value for determining whether to move a cluster belonging to the first layer to the second layer. That is, the number of clusters belonging to the first layer is regulated using the threshold Tc[1]. Note that while the value of Tc[1] in the present embodiment is 3, the value in the clustering processing method of the present invention is not limited thereto. The value of Tc[1] may be 1, 2 or 4 or more, and may be changed as required during processing. For example, Tc[1] may be set to a value of ⅒th or 1/20th of the value of num_cluster[2]. Alternatively, the value of Tc[1] may be set according to the pattern analyzed in the background determination unit 601, or according to the frequency with which clusters are newly defined on the first layer.

If the value of num_cluster[1] is smaller than Tc[1], and if processing of all of the pixels has not finished (NO at S201), layer moving processing for moving clusters from the first layer to the second layer is ended. If the value of num_cluster [1] is greater than or equal to Tc[1], or if processing of all of the pixels has finished (YES at S201), processing proceeds to S202. At S202, a loop index j for scanning all of the clusters belonging to the first layer is initialized. Next, it is determined at S203 whether to move a cluster C1$j$ (hereinafter, target cluster) belonging to the first layer to the second layer. In the present embodiment, the determination here involves determining to move the target cluster to the second layer if processing of all of the pixels has finished, or if the target cluster is a cluster with respect to which the most time has elapsed since being defined, out of the clusters belonging to the first layer. However, the clustering processing method of the present invention is not limited to these criteria, and the determination may, for instance, be performed based on the number of clusters, or the progress state or frequency of processing. For example, a cluster with a low probability of being allocated a pixel may be moved. Also, it may be determined to move a cluster with a low frequency of appearance of being allocated a cluster or pixel. Also, it may also be determined to move a cluster allocated with a small number of pixels, or to move a cluster according to the time elapsed since a pixel was last allocated. A plurality of clusters or all of the clusters may be moved in a single execution of layer moving processing. Further, a cluster may be moved when allocation processing is applied to a certain number of pixels or more. A single cluster allocated to the first layer is extracted based on the above determination criteria. If it is determined to be NO at S203, processing proceeds to S216. If it is determined to be YES at S203, the representative feature vector P1$j$ of the target cluster is acquired, and the value of num_cluster[1] is updated (S204).

Subsequently, as a result of the processing from S205 to S212, a search is made for clusters belonging to the second layer, and the cluster nearest the target cluster is extracted. An Mth layer cluster search step is thereby realized. Firstly, it is determined whether a cluster belonging to the second layer has already been defined (S205). If a cluster belonging to the second layer has not been defined (YES at S205), processing proceeds to S215, and a cluster belonging to the second layer is newly defined. If a cluster has already been defined (NO at S205), processing proceeds to S206.

At S206, a loop index k and a variable min_distance[2] for scanning all of the clusters belonging to the second layer are initialized. The initial value of min_distance[2] is set to the aforementioned MAX_VALUE. Next, a representative feature vector P2k of a cluster C2k belonging to the second layer is acquired (S207). Next, a distance D(P1j, P2k) between P1j and P2k is computed (S208). Next, the value of D(P1j, P2k) is compared with the value of min_distance[2] (S209).

If the value of D(P1j, P2k) is greater than the value of min_distance[2] (NO at S209), processing proceeds to S211, and the loop index k is updated. If D(P1j, P2k) is less than or equal to min_distance[2] (YES at S209), min_distance[2] is updated to D(P1j, P2k) and nn_clust[2] is updated to k (S210), and k is updated at S211. At S212, it is determined whether comparison of the target cluster with all of the clusters belonging to the second layer has ended. If comparison has not ended (NO at S212), processing returns to S207. If comparison with all of the clusters belonging to the second layer has ended (YES at S212), processing proceeds to S213, and the value of min_distance[2] is compared with the value of a threshold T[2]. If min_distance[2] is greater than T[2] (NO at S213), a cluster whose representative feature vector is set to the feature vector of the target cluster is newly defined on the second layer, and num_cluster[2] is updated (S215). If min_distance[2] is less than or equal to T[2] (YES at S213), the target cluster is allocated to a cluster C2nn_clust[2] belonging to the second layer that is nearest in feature space, and the representative feature vector is updated (S214). An Mth layer cluster allocating step is realized by S214. Next, processing proceeds to S216, and it is determined whether processing on all of the clusters belonging to the first layer has ended. If ended (YES at S216), the layer moving processing is ended. If not ended (NO at S216), the loop index j is updated (S217), processing returns to S203, and the following cluster is targeted for processing. Processing is thereby applied in order to all of the clusters belonging to the first layer.

Result of Clustering Processing

The effect of the clustering processing method of the present embodiment will be described using the image shown in FIG. 7A. The image in FIG. 7A is constituted by 17 vertical pixels and 12 horizontal pixels, giving a total of 204 (17×12) pixels. FIG. 7B shows the information of clusters after clustering the image in FIG. 7A. FIG. 7C shows per-pixel distance calculation frequencies when a conventional nearest neighbor clustering method is applied. With this conventional method, the distance calculation frequency will be 809 times from FIG. 7C, because the distances between the feature vector of the target pixel and the representative feature vectors of all defined clusters need to be compared.

Figures 8A, 8B:
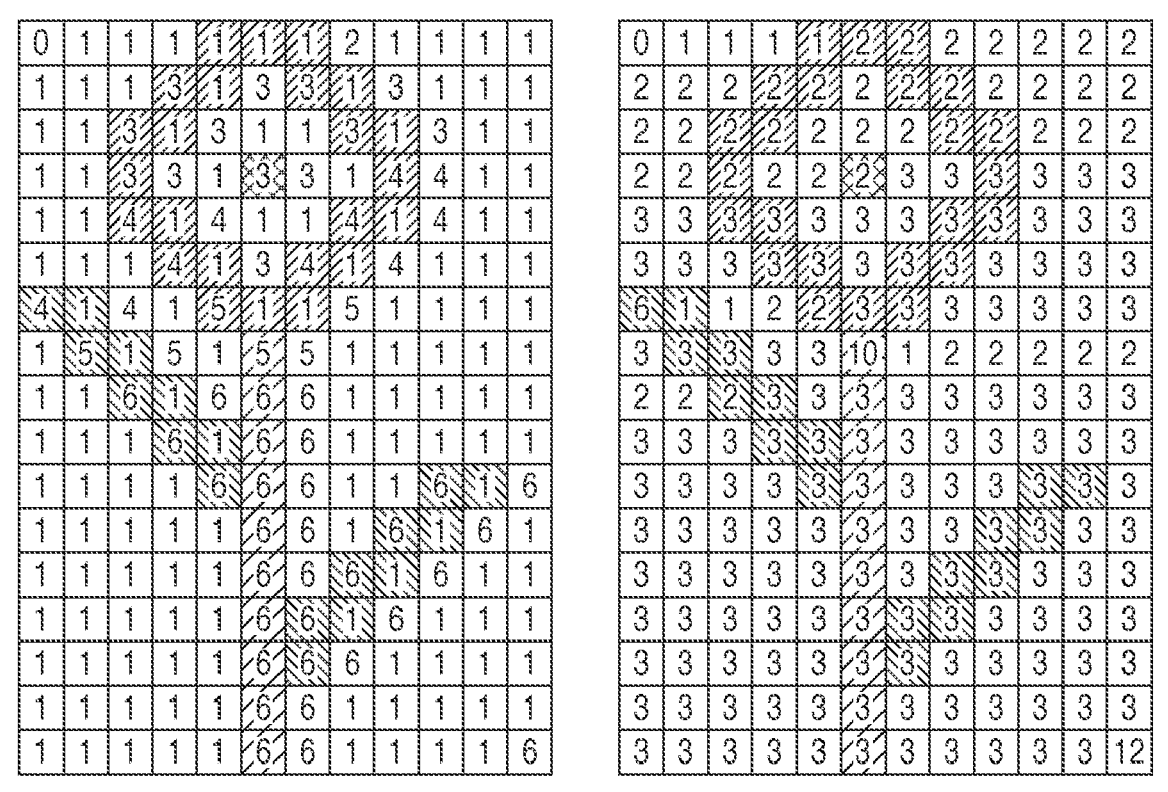

FIG. 7D shows per-pixel distance calculation frequencies when the clustering processing method of the present embodiment is applied to the image in FIG. 7A. As conditions in the current example, clusters are defined up to a second layer (K=2), the maximum number of clusters belonging to the first layer is set to 3 (Tc[1]=3), and a single cluster with respect to which the most time has elapsed since being defined is moved when performing layer moving processing on clusters. With the conventional method, the per-pixel distance calculation frequency increases according to the number of clusters. On the other hand, with the current example, a cluster to be allocated is determined within three distance calculations per pixel, provided that layer moving processing does not arise, since the maximum number of clusters belonging to the first layer is limited to 3. Referring to FIG. 7D, that is why pixels with respect to which the distance calculation has been performed 3 times per pixel constitute the majority. Pixels with a per-pixel distance calculation frequency of four or more are pixels that have undergone layer moving processing on clusters. The pixel at the bottom far right has a per-pixel distance calculation frequency of 12 because all of the clusters belonging to the first layer were last moved to the second layer, giving a distance calculation frequency of 579 in total from FIG. 7D. FIG. 8A shows per-pixel distance calculation frequencies when the clustering processing method of the present embodiment is applied to the image in FIG. 7A, where K=2 and Tc[1]=1. From FIG. 8A, the total distance calculation frequency will be 440 times.

Also, the clustering processing method of the present embodiment is applied to the image in FIG. 7A, after setting to move all of the clusters belonging to the first layer to the second layer when performing layer moving processing on clusters, where K=2 and Tc[1]=3. The per-pixel distance calculation frequencies at this time are shown in FIG. 8B. There is a pixel for which the distance calculation is performed 10 times, since all of the clusters belonging to the first layer (3 clusters) are moved to the second layer at one time during the processing. The pixel following this pixel undergoes processing in a state where there is one cluster belonging to the first layer. From FIG. 8B, the total distance calculation frequency will be 567 times, it being clear that the distance calculation frequency can be reduced in comparison with the conventional method in both cases.

Also, in the clustering processing method of the present embodiment, the two thresholds T[1] and T[2] having different values are used as conditions on the first layer and the second layer. By setting T[1] smaller than T[2], fast and highly accurate clustering can be performed.

A specific example of this will be described using FIGS. 9A to 9D. The above-mentioned feature vectors are three-dimensional vectors of RGB values, although in FIG. 9A, to simplify the description, the values of the 5×3 pixels indicate the per-pixel values of feature vectors, with the feature vectors of the image reduced to one-dimension. Also, it is assumed that processing is performed with the number of cluster layers set to 2 (K=2), and the maximum number of clusters belonging to the first layer set to 1 (Tc[1]=1). FIG. 9B shows a state where clustering processing on five pixels from the pixel on the left edge of the top row to a pixel 901 has ended. Firstly, a cluster 902 composed of three pixels having a feature vector 10 is defined on the first layer. When a fourth pixel 903 is input, a cluster 904 is newly defined, and the cluster 902 is moved from the first layer to the second layer. The pixel 901 is allocated to the cluster 904, which is on the first layer at this point in time.

Next, an undesirable result in the case where clustering processing is performed with values of T[1] and T[2] both set to 20 is shown in FIG. 9C. The distance between the feature vector of a pixel 905 and the feature vector of the cluster 904 is determined to be less than or equal to the threshold T[1] (YES at S111), and the pixel 905 is allocated to the cluster 904. The processing result is shown in FIG. 9C. On the other hand, the result of performing clustering with T[1] set to a smaller value than T[2] (T[1]=5, T[2]=20) will be as shown in FIG. 9D. This is because the distance between the feature vector of the pixel 905 and the feature vector of the cluster 904 is determined to be greater than the threshold T[1] (NO at S111). Accordingly, a cluster is further newly defined on the first layer following the clusters 902 and 904 at the point in time at which the pixel 905 is input. Then, the cluster is combined with the cluster 902 which is nearest in the subsequent layer moving processing. That is, highly accurate clustering can be performed by setting T[1] smaller than T[2]. This relation, when extended to general numbers, is defined as T[M−1]<T[M], whereby the threshold of the higher layer is set to a higher value.

Also, the optimal value of the maximum number of clusters per layer Tc[M] differs for each image. For example, configuring the settings based on the pattern analyzed in prior processing is conceivable in order to optimize the value of Tc[M]. For example, assume that a target image having a repetitive three-color pattern, such as shown in FIG. 10, is analyzed in the background determination unit 601 of the vector data conversion apparatus (FIG. 6). In such a case, fast operation can be performed by setting the maximum value of clusters belonging to the first layer Tc[1] to 3.

As already discussed, in the present invention, thresholds and cluster search conditions can be variously set in accordance with the features of the processing target. Needless to say, the present invention is not limited to the abovementioned conditions and values, and optimal values for the processing target that have been derived empirically may be used.

Second Embodiment

The clustering processing method of a Second Embodiment and a vector data conversion apparatus that uses this method will be described. FIG. 6 shows the configuration of the vector data conversion apparatus, which is the same as that described with the clustering processing method in the First Embodiment of the present invention.

Hereinafter, the processing of the clustering processing unit 602 will be described in detail. In the present embodiment, cluster layers are defined up to an Lth layer (K=L). In the present embodiment, only layer moving processing will be described in detail using the flowchart shown in FIGS. 3A and 3B, since the processing is the same as that described in the First Embodiment of the present invention, apart from the content of the layer moving processing of S113 and S116 in FIG. 1.

Figure 3A:
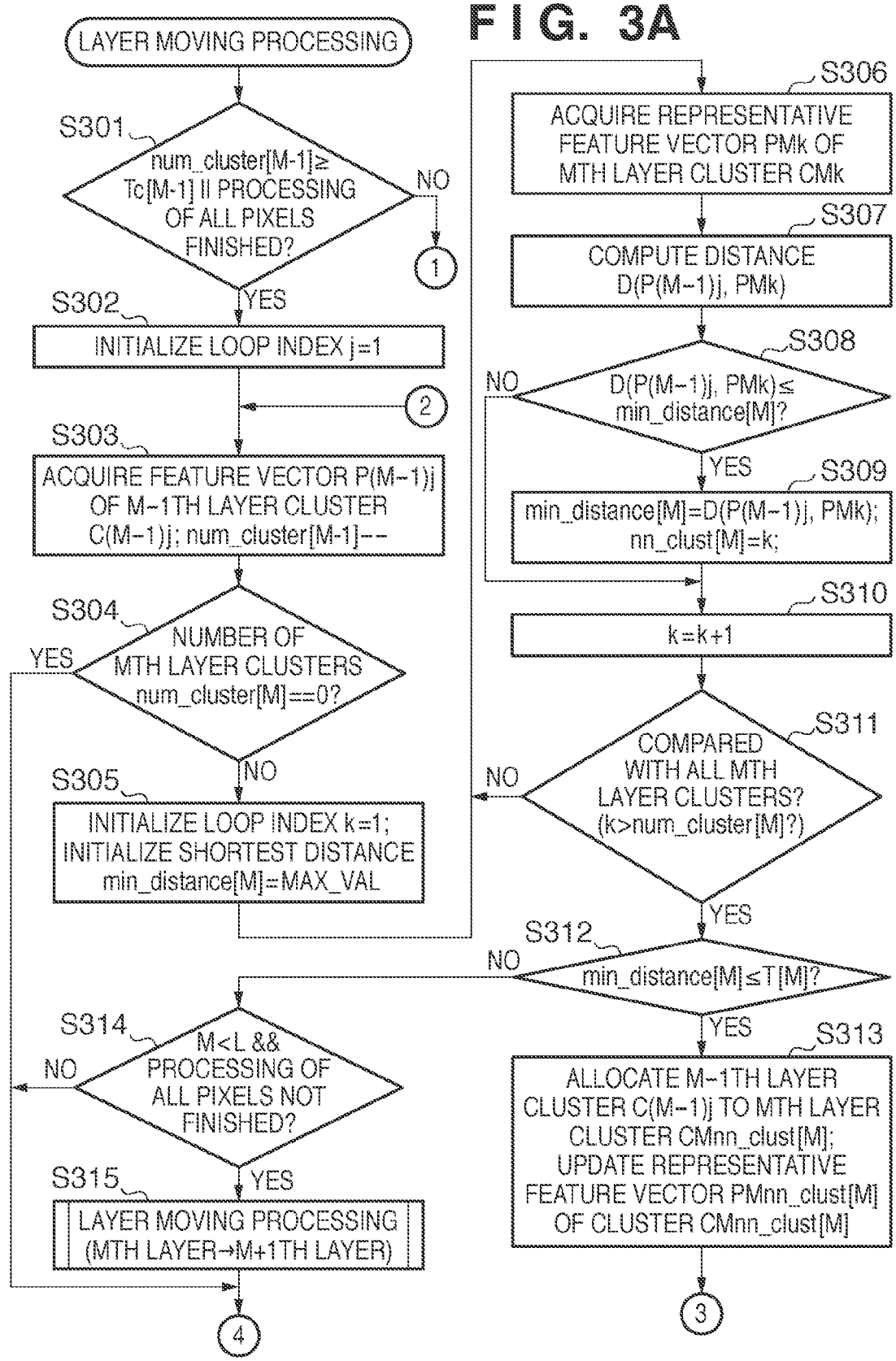
FIGS. 3A and 3B show flowcharts of a layer moving processing method according to a Second Embodiment.
Figure 3B:
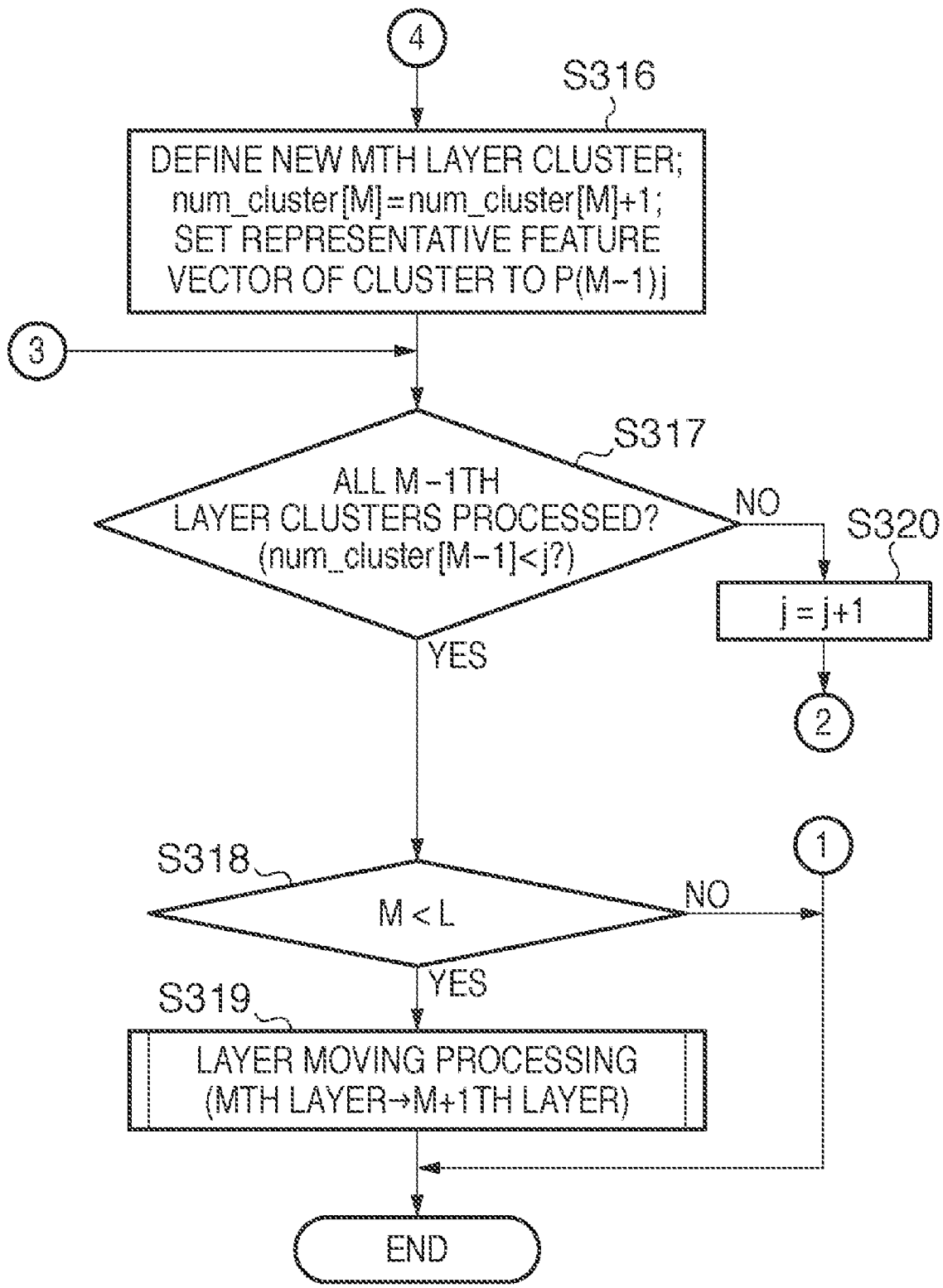

FIGS. 3A and 3B represent a flowchart when moving clusters belonging to the M−1th layer to the Mth layer. Firstly, in S301, it is determined whether the comparison of the number of cluster belonging to the M−1th layer num_cluster[M−1] with a threshold Tc[M−1] and processing of all of the pixels have finished. The threshold Tc[M−1] is a value for determining whether to move clusters belonging to the M−1th layer to the Mth layer. Note that while the values of Tc[M] in the present embodiment are all 3, the clustering processing method of the present invention is not limited thereto. The values of Tc[M] may be 1, 2 or 4 or more, and may be set to respectively different values or changed as required during processing. For example, Tc[M−1] may be set to a value of 1/10th or 1/20th of the value of num_cluster[M]. Alternatively, the value of Tc[M−1] may be set according to the pattern analyzed in the background determination unit 601, or according to the frequency with which clusters are newly defined on the M−1th layer.

If the value of num_cluster[M−1] is smaller than Tc[M−1], and processing of all of the pixels has not finished (NO at S301), layer moving processing for moving clusters from the M−1th layer to the Mth layer is ended. If the value of num_cluster[M−1] is greater than or equal to Tc[M−1], or if processing of all of the pixels has finished (YES at S301), processing proceeds to S302, and the actual layer moving is performed. Note that in the present embodiment, all of the clusters belonging to the M−1th layer are moved to the Mth layer when moving layers. However, the clustering processing method of the present invention is not limited thereto, and only a cluster belonging to the M−1th layer with a low probability of being allocated a pixel (or cluster) may be moved, for example. For example, a cluster belonging to the M−1th layer with respect to which the elapsed time since being defined is long may be moved, or it may be determined to move a cluster allocated with a small number of pixels (or clusters). Also, a cluster may be moved according to the time elapsed since a pixel (or cluster) was last allocated.

At S302, a loop index j for scanning all of the clusters belonging to the M−1th layer is initialized. Next, the representative feature vector P(M−1)j of the target cluster C(M−1)j is acquired, and the value of num_cluster[M−1] is updated (S303). Next, it is determined whether a cluster belonging to the Mth layer has already been defined (S304). If a cluster belonging to the Mth layer has not been defined (YES at S304), processing proceeds to S316, and a cluster of the Mth layer is newly defined. If a cluster has already been defined (NO at S304), processing proceeds to S305.

Subsequently, as a result of the processing from S305 to S311, a search is made for clusters belonging to the Mth layer, and the cluster nearest the target cluster on the M−1th layer is extracted. An Mth layer cluster search step is thereby realized. At S305, a loop index k and a variable min_distance[M] for scanning all of the clusters belonging to the Mth layer are initialized. The initial value of min_distance[M] is set to MAX_VALUE, which was discussed in the First Embodiment. min_distance[M] is a variable representing the smallest value of the distances between the feature vector of the target pixel (or cluster) and the representative feature vectors of the clusters belonging to the Mth layer. Next, a representative feature vector PMk of a cluster CMk belonging to the Mth layer is acquired (S306). Next, a distance D(P(M−1)j, PMk) between P(M−1)j and PMk is computed (S307). Next, the value of D(P(M−1)j, PMk) is compared with the value of min_distance[M] (S308).

If the value of D(P(M−1)j, PMk) is greater than the value of min_distance[M] (NO at S308), processing proceeds to S310, and the loop index k is updated. If D(P(M−1)j, PMk) is less than or equal to min_distance[M] (YES at S308), min_distance[M] is updated to D(P(M−1)j, PMk) and nn_clust[M] is updated to k (S309). Next, the loop index k is updated at S310. At S311, it is determined whether comparison of the target cluster with all of the clusters belonging to the Mth layer has ended. If comparison has not ended (NO at S311), processing returns to S306. If comparison with all of the clusters belonging to the Mth layer has ended (YES at S311), processing proceeds to S312, and the value of min_distance[M] is compared with the value of a threshold T[M]. The threshold T[M] is a value serving as a criterion for determining whether to allocate the target pixel (or cluster) to a defined cluster belonging to the Mth layer, or whether to define a new cluster on the Mth layer and allocate the target pixel (or cluster) to that cluster.

If min_distance[M] is less than or equal to T[M] (YES at S312), the target cluster is allocated to a cluster CMnn_clust[M] belonging to the Mth layer that is nearest in feature space, and the representative feature vector is updated (S313). An Mth layer cluster allocating step is thereby realized. Note that in the present embodiment, since M=2, a cluster belonging to the first layer will be allocated to the second layer. Next, processing proceeds to S317 (described later). If min_distance[M] is greater than T[M] (NO at S312), processing proceeds to S314. At S314, it is determined whether the Mth layer is less than the defined number of layers L, and whether processing of all of the pixels has not finished. If M is less than L, and processing of all of the pixels has not finished (YES at S314), layer moving processing from the Mth layer to the M+1th layer is performed (S315). This involves changing the layer targeted for processing and recursively performing processing from S301. If M is greater than or equal to L or if processing of all of the pixels has finished (NO at S314), processing proceeds to S316. At S316, a cluster whose representative feature vector is set to the feature vector of the target cluster is newly defined on the Mth layer, and num_cluster[M] is updated.

At S317, it is determined whether processing on all of the clusters belonging to the M−1th layer has ended. If ended (YES at S317), processing proceeds to S318. In the case where processing on all of the clusters belonging to the M−1th layer has not ended (NO at S317), the loop index j is updated (S320), processing returns to S303, and the following cluster is targeted for processing. At S318, it is determined whether the Mth layer is less than the defined number of layers L. If M is less than L (YES at S318), layer moving processing from the Mth layer to the M+1th layer is performed (S319). If M is greater than or equal to L (NO at S318), layer moving processing from the M−1th layer to the Mth layer is ended.

Result of Clustering Processing

Next, the effect of the clustering processing method of the present embodiment will be described using the image shown in FIG. 11. FIG. 11 shows per-pixel distance calculation frequencies when the clustering processing method of the present embodiment is applied to the image in FIG. 7A. As conditions in the current example, processing is performed with clusters defined up to a third layer (K=3), the maximum number of clusters Tc set respectively to Tc[1]=1 and Tc[2]=3, and all of the clusters belonging to the M−1th layer are moved to the Mth layer when performing layer moving processing on clusters. With the current example, it is clear that the distance calculation frequency when layer moving processing from the first layer to the second layer arises is further reduced in comparison with FIG. 8A, since the number of clusters on the second layer is also regulated. Instead, the distance calculation frequency increases for pixels that newly undergo layer moving processing from the second layer to the third layer which did not arise in FIG. 8A. However, it is clear that the total distance calculation frequency, which is 404 times from FIG. 11, can be reduced in comparison with the conventional method.

Also, since the effect of reducing the distance calculation frequency decreases when the maximum number of clusters Tc on the lower layer is set too high, Tc desirably satisfies the relation Tc[M−1]≦Tc[M].

Third Embodiment

The clustering processing method of a Third Embodiment and a vector data conversion apparatus that uses this method will be described. FIG. 6 shows the configuration of the vector data conversion apparatus, which is the same as that described in the First Embodiment of the present invention.

Hereinafter, the processing of the clustering processing unit 602 will be described in detail. In the present embodiment, the timing and conditions for performing layer moving processing have been changed from the clustering processing method described in the Second Embodiment. Note that cluster layers are defined up to L, similarly to the Second Embodiment.

Figure 4:
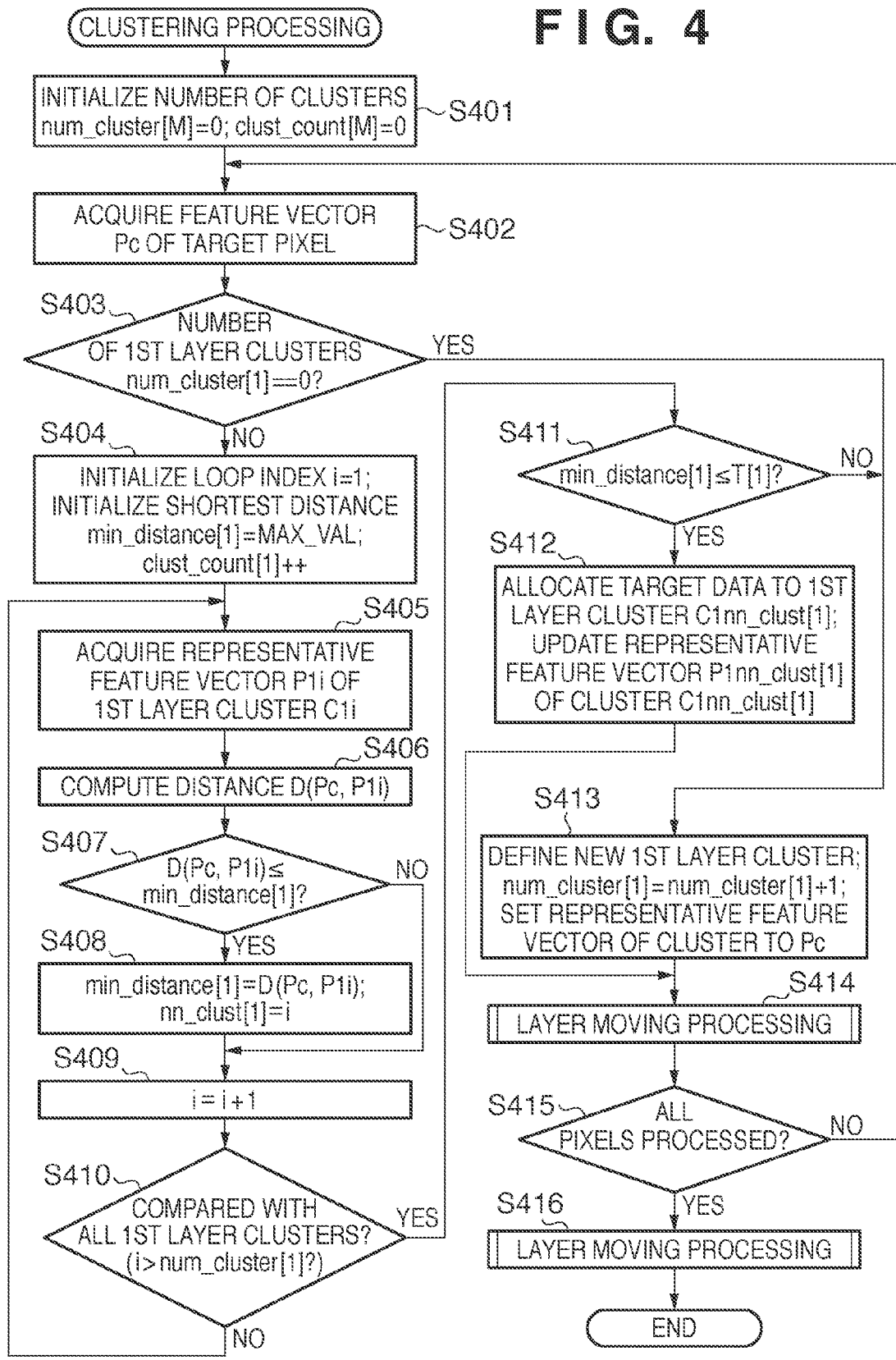
FIG. 4 shows a flowchart of a clustering processing method according to a Third Embodiment.

The clustering processing unit 602 of the present embodiment will be described in detail using the flowchart in FIG. 4. Firstly, variables num_cluster[M] representing the number of clusters belonging to an Mth (M=1, 2, . . . , K−1, K) layer and variables clust_count[M] representing the number of processed pixels (or clusters) on an Mth layer are all initialized to 0 (S401). clust_count[1] represents the number of processed pixels on the first layer, and clust_count[M] otherwise represents the number of processed clusters on an Mth layer. Since the subsequent processing from S402 to S403 and S405 to S412 is respectively the same as the processing from S102 to S103 and S105 to S112 of the clustering processing method of the First Embodiment (FIG. 1), description will be omitted. At S404, clust_count[1] is updated in addition to the processing of S104 of the clustering processing method in the First Embodiment.

Next, at S413, a cluster whose representative feature vector is set to the feature vector of the target pixel is newly defined on the first layer, and num_cluster[1] is updated, after which layer moving processing (discussed later) is performed (S414). The layer moving processing will be discussed later using FIGS. 5A and 5B. Next, at S415, it is determined whether processing on all of the pixels has ended. If ended (YES at S415), clustering processing is ended after layer moving processing has been performed at S416. If not ended (NO at S415), processing returns to S402, and the following pixel is targeted for processing.

Layer Moving Processing

Figure 5B:
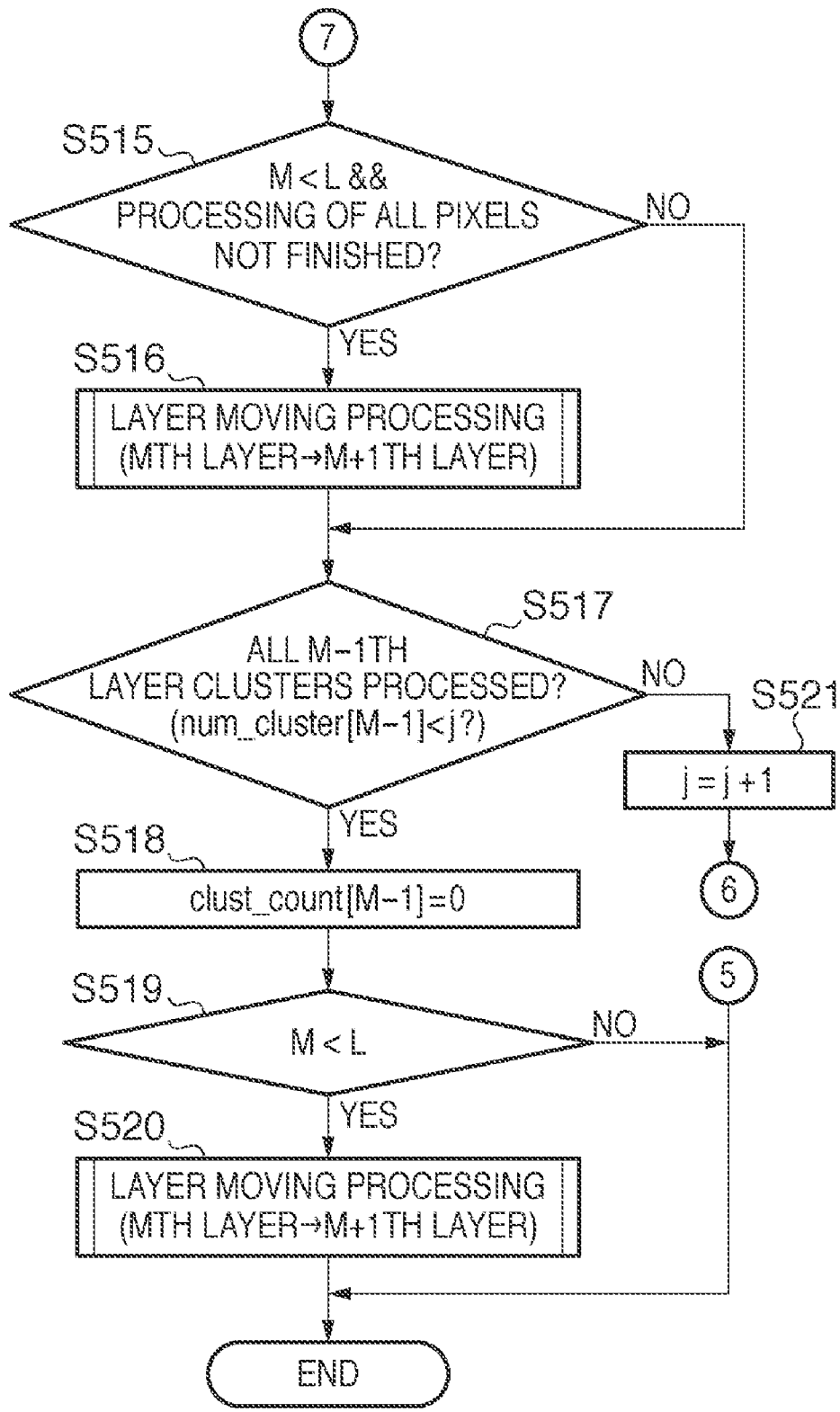

The layer moving processing of S414 and S416 in FIG. 4 will be described in detail using FIGS. 5A and 5B. Firstly, in S501, it is determined whether to actually move a cluster layer. As for the determination method, it is determined whether processing of all of the pixels has finished, or whether clust_count[M−1] is greater than Tcount[M−1]. Tcount[M−1] here is a prescribed threshold for determining whether to move clusters of the M−1th layer to the Mth layer, according to the number of processed pixels (or clusters). If processing of all of the pixels has finished or if the value of clust_count[M−1] is greater than Tcount[M−1] (YES at S501), a loop index j is initialized (S502). j is a loop index for scanning all of the clusters belonging to the M−1th layer. If processing of all of the pixels has not finished and the value of clust_count[M−1] is less than or equal to Tcount[M−1] (NO at S501), the layer moving processing is ended without moving clusters.

At S503, the representative feature vector P(M−1)j of the target cluster C(M−1)j is acquired, and the values of num_cluster[M−1] and clust_count[M] are respectively updated (S503). Since the processing from S504 to S513 is the same as S304 to S313 of the clustering processing method in the Second Embodiment of the present invention (FIGS. 3A and 3B), description will be omitted.

At S514, a cluster whose representative feature vector is set to the feature vector of the target cluster is newly defined on the Mth layer, and num_cluster[M] is updated. The representative feature vector of the defined cluster is set to P(M−1)j. Next, it is determined whether M is less than the defined number of layers L, and whether processing of all of the pixels has not finished (S515). If M is less than L and processing of all of the pixels has not finished (YES at S515), layer moving processing from the Mth layer to the M+1th layer is performed (S516). This involves changing the layer targeted for processing and recursively performing processing from S501. If M is greater than or equal to L or if processing on all of the pixels has finished (NO at S515), processing proceeds to S517.

At S517, it is determined whether processing on all of the clusters belonging to the M−1th layer has ended. Specifically, it is determined whether num_cluster[M−1] is greater than 1. If ended (YES at S517), processing proceeds to S518. In the case where processing on all of the clusters belonging to the M−1th layer has not ended (NO at S517), the loop index j is updated (S521), processing returns to S503, and processing is continued with the following cluster as the target cluster. At S518, the value of clust_count[M−1] is updated to 0. Next, it is determined whether the Mth layer is less than the defined number of layers L (S519). If M is less than L (YES at S519), layer moving processing from the Mth layer to the M+1th layer is performed (S520). This involves changing the layer targeted for processing and recursively performing processing from S501. If M is greater than or equal to L (NO at S519), layer moving processing from the M−1th layer to the Mth layer is ended.

Result of Clustering Processing

Next, the effect of the clustering processing method of the present embodiment will be described using the image shown in FIG. 12. FIG. 12 shows per-pixel distance calculation frequencies when the clustering processing method of the present embodiment is applied to the image in FIG. 7A. As conditions in the current example, clusters are defined up to a second layer (K=2), layer moving processing is performed every line (every 12 pixels), and all of the clusters belonging to the first layer are moved to the second layer when performing layer moving processing on clusters. In the present embodiment, the distance calculation frequency of pixels on the right edge of the image data is high, since the layer moving processing on clusters is performed when processing the pixels on the right edge. The distance calculation frequency of pixels on the left edge is 0, since processing starts each time from a state where clusters belonging to first layer have been reset. It is clear that the total distance calculation frequency, being 544 times from FIG. 12, can be reduced in comparison with the conventional method.

Note that while layer moving processing on clusters is performed every line when processing the pixels on the right edge of the image data in the present embodiment, the present invention is not limited thereto, and layer moving processing on clusters may be applied every two lines, for example.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-181016, filed Aug. 3, 2009, which is hereby incorporated by reference herein in its entirety.

What is claimed is:

1. A clustering processing method for dividing a sample group into a plurality of clusters based on a feature amount of each sample, the plurality of clusters each belonging to one of a plurality of layers composed of M layers (M=2, ..., K), the clustering processing method comprising:
a sample allocating step of allocating a sample targeted for processing to a cluster belonging to a first layer, based on a result of comparing the feature amount of the target sample with a representative feature amount of each of clusters belonging to the first layer;
a determination step of determining whether to allocate a cluster belonging to an M−1th layer to an Mth layer; and
a cluster allocating step of allocating a cluster belonging to the M−1th layer to the Mth layer, if it is determined in the determination step to allocate a cluster belonging to the M−1th layer to the Mth layer,
wherein the sample allocating step, the determination step and the cluster allocating step are repeatedly executed with the samples each targeted for processing in order, until all of the samples are allocated to one of clusters belonging to a Kth and highest layer.

2. The clustering processing method according to claim 1, wherein the sample allocating step includes:
a first layer cluster search step of searching a plurality of clusters belonging to the first layer for a cluster having a representative feature amount nearest the feature amount of the target sample; and
a first layer cluster allocating step of allocating the target sample to a cluster retrieved in the first layer cluster search step if a distance between the retrieved cluster and the target sample is less than or equal to a first distance threshold, and allocating the target sample to a cluster newly defined on the first layer if the distance is greater than the first distance threshold.

3. The clustering processing method according to claim 1, wherein the cluster allocating step includes:
an Mth layer cluster search step of searching a plurality of clusters belonging to the Mth layer for a cluster having a representative feature amount nearest a representative feature amount of a cluster targeted for processing belonging to the M−1th layer, if it is determined in the determination step to allocate a cluster to the Mth layer; and
an Mth cluster allocating step of allocating the target cluster to the cluster belonging to the Mth layer retrieved in the Mth layer cluster search step if a distance between the retrieved cluster and the target cluster is less than or equal to an Mth distance threshold, and allocating the target cluster to a cluster newly defined on the Mth layer if the distance is greater than the Mth distance threshold.

4. The clustering processing method according to claim 1, wherein it is determined in the determination step to allocate a cluster belonging to the M−1th layer to the Mth layer, if clusters belonging to the M−1th layer exceed a prescribed threshold number of clusters.

5. The clustering processing method according to claim 2, wherein it is determined in the determination step to allocate a cluster belonging to the first layer to a second layer, when the first layer cluster allocating step has been performed on a prescribed number of samples.

6. The clustering processing method according to claim 3, wherein it is further determined in the determination step whether to allocate a cluster belonging to the Mth layer to an M+1th layer, when the Mth cluster allocating step is applied to the Mth layer which is higher than a cluster group belonging to the M−1th layer.

7. The clustering processing method according to claim 1, wherein it is determined in the determination step to allocate to the Mth layer a cluster belonging to the M−1th layer that has a low probability of being allocated a sample.

8. The clustering processing method according to claim 1, wherein it is determined in the determination step to allocate to the Mth layer a cluster belonging to the M−1th layer that has a low frequency of appearance as a cluster to which a sample is allocated.

9. The clustering processing method according to claim 1, wherein it is determined in the determination step to allocate a cluster belonging to the M−1th layer to the Mth layer, based on an elapsed time since being newly defined.

10. The clustering processing method according to claim 4, wherein a threshold number of clusters for clusters belonging to the Mth layer is greater than the threshold number of clusters for clusters belonging to the M−1th layer.

11. The clustering processing method according to claim 3, wherein an M−1th distance threshold is smaller than the Mth distance threshold.

12. A clustering processing apparatus for dividing a sample group into a plurality of clusters based on a feature amount of each sample, the plurality of clusters each belonging to one of a plurality of layers composed of M layers (M=2, . . . , K), the clustering processing apparatus comprising:
 a sample allocating unit that allocates a sample targeted for processing to a cluster belonging to a first layer, based on a result of comparing the feature amount of the target sample with a representative feature amount of each of clusters belonging to the first layer;
 a determination unit that determines whether to allocate a cluster belonging to an M−1th layer to an Mth layer; and
 a cluster allocating unit that allocates a cluster belonging to the M−1th layer to the Mth layer, if it is determined by the determination unit to allocate a cluster belonging to the M−1th layer to the Mth layer,
 wherein processing by the sample allocating unit, the determination unit and the cluster allocating unit is repeatedly executed with the samples each targeted for processing in order, until all of the samples are allocated to one of clusters belonging to a Kth and highest layer.

13. A non-transitory computer-readable medium storing a computer program for causing a computer to functions as:
 a sample allocating unit that allocates a sample targeted for processing to a cluster belonging to a first layer, based on a result of comparing a feature amount of the target sample with a representative feature amount of each of clusters belonging to the first layer, out of clusters belonging to one of a plurality of layers composed of M layers (M=2, . . . , K);
 a determination unit that determines whether to allocate a cluster belonging to an M−1th layer to an Mth layer; and
 a cluster allocating unit that allocates a cluster belonging to the M−1th layer to the Mth layer, if it is determined by the determination unit to allocate a cluster belonging to the M−1th layer to the Mth layer,
 wherein processing by the sample allocating unit, the determination unit and the cluster allocating unit is repeatedly executed with the samples each targeted for processing in order, until all of the samples are allocated to one of clusters belonging to a Kth and highest layer.

* * * * *